(12) United States Patent
Monary (10) Patent No.: US 6,588,785 B2
(45) Date of Patent: Jul. 8, 2003

(54) PEDAL POWERED VEHICLE

(75) Inventor: Chuck Monary, Mission Viejo, CA (US)

(73) Assignee: C & A Products, Inc., Mission Viejo, CA (US)

( * ) Notice: Subject to any disclaimer, the term of this patent is extended or adjusted under 35 U.S.C. 154(b) by 0 days.

(21) Appl. No.: 09/855,191

(22) Filed: May 14, 2001

(65) Prior Publication Data

US 2003/0080532 A1 May 1, 2003

(51) Int. Cl.$^7$ .......................... B62M 25/00; B62M 1/02; B62K 1/00
(52) U.S. Cl. ..................... 280/238; 280/261; 280/288.1; 280/287; 280/278; 280/282
(58) Field of Search ................................ 280/237, 238, 280/240, 261, 263, 264, 270, 288.1, 282, 278, 287

(56) References Cited

U.S. PATENT DOCUMENTS

| | | |
|---|---|---|
| 242,212 A | 5/1881 | McKenzie |
| 248,441 A | 10/1881 | Fowler |
| 264,073 A | 9/1882 | Gallup |
| 269,609 A | 12/1882 | White |
| 274,231 A | 3/1883 | Starley |
| 364,466 A | 6/1887 | Bate |
| 2,501,035 A | 3/1950 | Doak et al. ................. 280/259 |
| 3,403,927 A | 10/1968 | Rettger, Jr. ................. 280/261 |
| 3,938,828 A | 2/1976 | Hammond ................... 280/261 |
| 4,134,481 A | 1/1979 | Calderazzo .................... 192/5 |
| 4,408,776 A | 10/1983 | Randolph et al. ........... 280/261 |
| 4,456,277 A * | 6/1984 | Carpenter ................... 280/282 |
| RE32,681 E | 5/1988 | Randolph et al. ........... 280/261 |
| 4,766,772 A | 8/1988 | Tsuchie ....................... 74/126 |
| 4,786,070 A * | 11/1988 | Adee ........................... 280/287 |
| 5,004,083 A | 4/1991 | Lohman ......................... 192/5 |
| 5,116,067 A | 5/1992 | Johnson ..................... 280/7.14 |
| 5,135,243 A | 8/1992 | Carpenter .................. 280/7.14 |
| 5,253,607 A | 10/1993 | Chen ........................... 114/357 |
| 5,286,080 A | 2/1994 | Ringdal et al. ............. 296/185 |
| 5,484,152 A | 1/1996 | Nunes et al. ............... 280/282 |
| 5,544,906 A * | 8/1996 | Clapper .................... 280/288.1 |
| 5,551,719 A | 9/1996 | Rettger, Jr. ................. 280/282 |
| 5,853,062 A * | 12/1998 | Hulett ...................... 280/288.1 |
| 5,997,017 A | 12/1999 | Tilley ..................... 280/87.021 |
| 6,113,116 A | 9/2000 | Stanton et al. ................ 280/24 |
| 6,155,580 A | 12/2000 | Symons ................. 280/33.991 |
| 6,179,314 B1 | 1/2001 | Jones .......................... 280/282 |

\* cited by examiner

Primary Examiner—Lesley D. Morris
Assistant Examiner—Matthew Luby
(74) Attorney, Agent, or Firm—Holland & Knight LLP (57) ABSTRACT

The present invention relates to a vehicle, which is specifically adapted to be used as a bumper car. The vehicle is constructed from a frame that allows the vehicle to absorb and deliver impacts in a more efficient manner. Additionally, the vehicle includes steering and clutch assemblies-that allow for increased maneuverability. This increased maneuverability makes for,a more pleasurable and exciting bumper car game.

6 Claims, 9 Drawing Sheets

PEDAL POWERED VEHICLE

BACKGROUND OF THE INVENTION

1. Field of the Invention

This invention relates to a human powered vehicle. More particularly, the present invention relates to a pedal powered vehicle that is specifically adapted to deliver and receive forceful impact and which can be used as part of a bumper car game.

2. Description of the Background Art

Presently, the use of human powered vehicles is known in the art. Additionally, the use of human powered, three-wheeled vehicles is also known.

The background art contains numerous examples of three-wheeled vehicles. For instance, U.S. Pat. No. 5,484,152 to Nunes et al. discloses a recumbent tricycle apparatus with differential brake steering. The tricycle is for use as a recreational or short-ranged commuter vehicle. Manual brake handles on either side of the operator seat can be used to brake the vehicle and steer the vehicle through braking. Specifically, application of a single brake will cause the tricycle to -rapidly pivot around the braked wheel.

Furthermore, U.S. Pat. No. 6,179,314 to Jones discloses a three-wheeled, human powered, ride-on vehicle. The vehicle includes a steering mechanism that utilizes a control stick, control rods and cables to effect movement of the rear wheel, and thus, steering of the vehicle.

U.S. Pat. No. 5,551,719 to Rettger, Jr. discloses a pedal propelled tricycle with two front wheels and one rear wheel. The rear wheel is rotated by way of a worm gear arrangement and effects steering of the vehicle. Additionally, a differential gearing arrangement is included which permits the front wheels to rotate at the same angular velocity when the vehicle is moving in a straight line and to rotate at different angular velocities when the vehicle is turning.

The background art also contains examples of bumper car-type vehicles. For example, U.S. Pat. No. 3,938,828 to Hammond discloses an occupant propelled tricycle-type recreational vehicle. The vehicle includes an inflated flexible bag attached to its outer periphery such as to provide controlled bumping of similar vehicles or other objects. Similarly, U.S. Pat. No. 5,997,017 to Tilley discloses a human powered bumper car. The car is propelled by it is; occupant through the movement of their feet upon the ground. The bumper of the car encircles the car and is typically raised up slightly above the elevation of the driver's seat.

Although each of the above-referenced inventions achieves its individual objective, none of them illustrate a bumper car-type vehicle with clutch and steering mechanisms that allow for increased maneuverability. Moreover; none of the above-referenced inventions illustrates a pedal powered bumper car-type vehicle wherein the occupant is in a recumbent position.

SUMMARY OF THE INVENTION

It is therefore one of the objectives of this invention to provide a bumper car-type vehicle with increased maneuverability whereby occupants can derive more enjoyment from bumper car-type games.

It is also an object of this invention to provide a bumper car-type vehicle with improved materials whereby vehicle impacts can be delivered and received more efficiently. Still another object of this invention is to provide a bumper car-type vehicle wherein the operator is positioned in a recumbent orientation during the movement of the vehicle.

These and other objectives are accomplished by providing a pedal powered vehicle having a frame constructed from a rotationally molded impact absorbing plastic. The vehicle includes two powered wheels and one rearward steering wheel. The vehicle also includes a seating arrangement that allows the operator of the vehicle to sit in a recumbent orientation.

A crank assembly is located at a position forward of and above the powered wheels. A chain drive is employed in interconnecting the crank assembly with an axle assembly, which supports the two powered wheels. As such the crank can be employed in delivering power to the wheels.

The vehicle further includes steering handles on either side of the frame. Each handle is interconnected to a steering sprocket by way of a flexible and rigid linkage. As such, linear movement of either handles results in rotation of the corresponding sprocket. A chain drive interconnects both of the sprockets with the rear steering wheel. Thus, linear movement of either handle results in rotational movement of both the sprockets and the rear wheel.

The vehicle further includes an axle assembly, which is comprised of first and second axle components. These components are interconnected by way of a differential, which allows the two powered wheels to rotate at different angular velocities. A clutch assembly is included for use in rotating the axle components. The clutch assembly includes both female and male. clutch elements. The female clutch element has a series of cavities within its inner face. The male clutch element is engaged and driven by the drive chain and has an inner face with a friction lining and a series of spring biased pawls. The male clutch element has two orientations. In the first orientation, the friction lining-is made to engage the inner face of the female clutch element. In this orientation, the operator can employ the crank assembly to rotate the axle components in either a forward or rearward sense. In the second orientation, the friction lining is disengaged and the spring biased pawls of the male clutch element are made to engage the corresponding cavities within the female clutch element. In this orientation, the crank assembly can only deliver one rotational sense to the axle components. The vehicle is thus permitted to coast in this orientation. Ultimately, by way of the clutch the operator can pedal the vehicle forward or reverse, or allow the vehicle to coast.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to a vehicle, which is specifically adapted to be used as a bumper car. The vehicle is constructed from a frame that allows the vehicle to absorb and deliver impacts in a more efficient manner. Additionally, the vehicle includes steering and clutch assemblies that allow for increased maneuverability. This increased maneuverability makes for a more pleasurable and exciting bumper car game. The various components of the present invention, in the manner in which they interrelate, will be described in more detail hereinafter.

Figure 1:
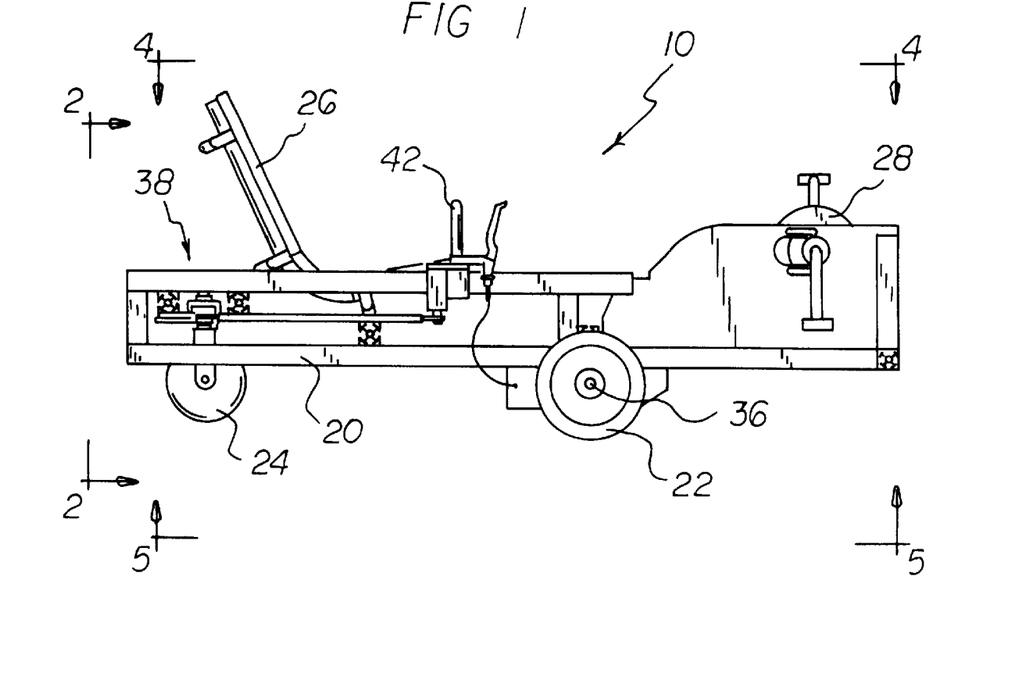
FIG. 1 is a side elevational view of the vehicle of the present invention.
Figure 2:
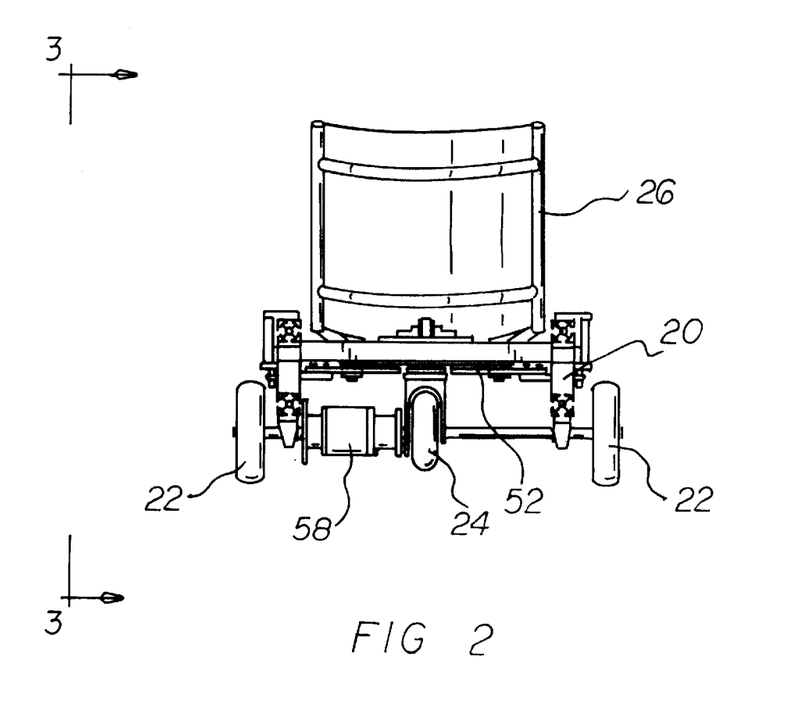
FIG. 2 is a rear elevational view of the vehicle.

With reference now to FIG. 1, the vehicle 10 and vehicle frame 20 of the present invention are depicted. This frame 20 is specifically designed to absorb the impacts that are associated with bumper car-type activities. Furthermore, the frame 20 allows the vehicle 10 to deliver forceful impacts either to other similar type vehicles or to other miscellaneous objects. In the preferred embodiment, the frame 20 is constructed from a rotationally. molded impact absorbing plastic. As is known in the art, rotational molding, or rotomolding, is a process that creates seamless parts of a uniform wall thickness. As such, rotationally molded products can absorb increased shocks and stresses. Rotationally molded pieces are created by loading plastic resins into a mold, the mold is then closed and heated and rotated slowly on both vertical and horizontal axes. Although the frame has been described as produced by way of rotational molding, other molding processes are within the scope of the present invention.

Figure 5:
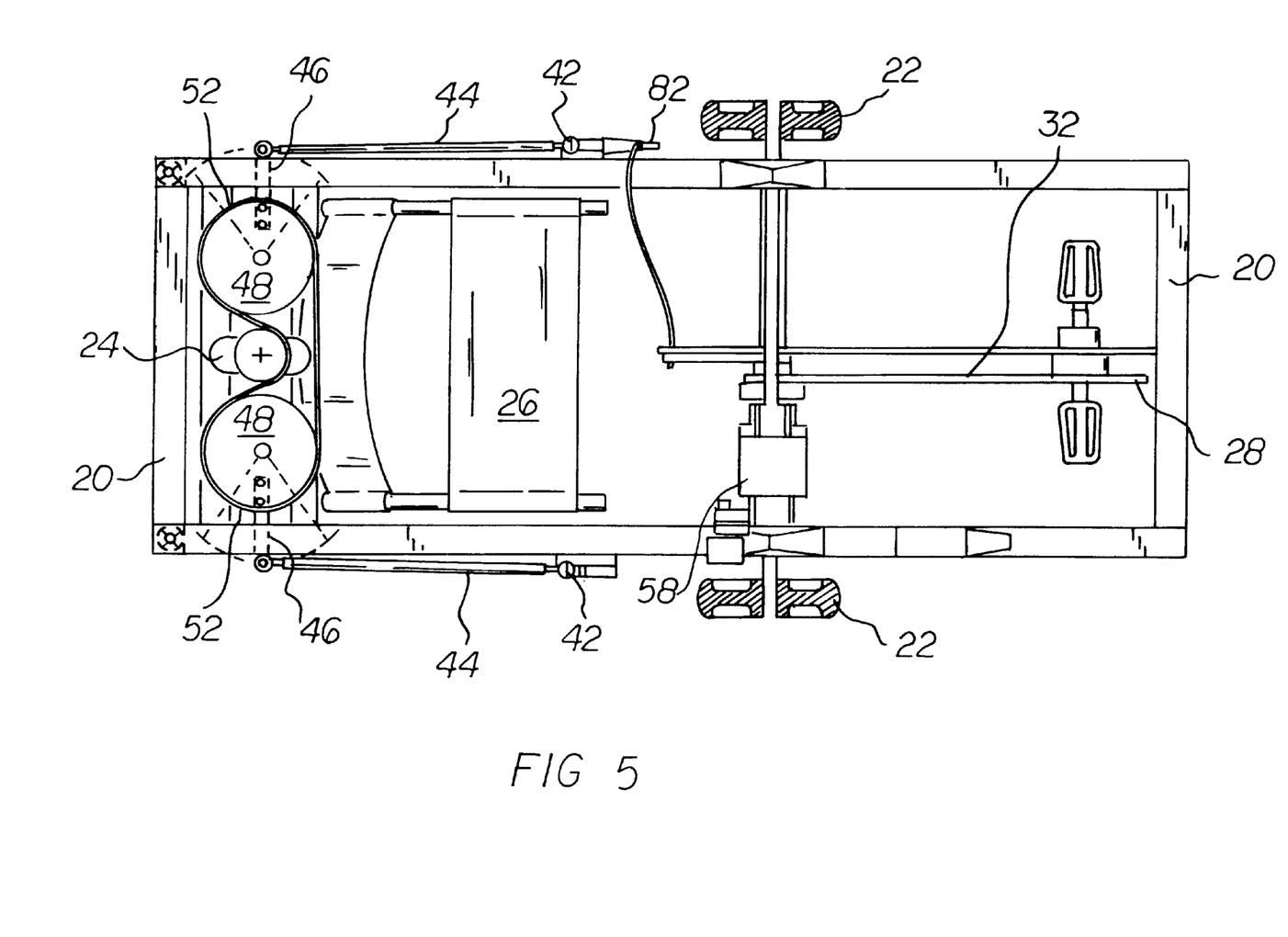
FIG. 5 is a top sectional view of the vehicle of the present invention.

With reference now to FIG. 5, the wheels of the vehicle 10 are depicted. As illustrated, the vehicle is preferably three wheeled. However, a vehicle utilizing any number of wheels, powered or un-powered, is within the scope of the present invention. Two powered wheels 22 are interconnected to the frame 20 intermediate the first and second ends of the vehicle 10. Additionally, one steering wheel 24 is interconnected to the vehicle frame 20 at the rearward extent. Finally, FIG. 5 illustrates the recumbent seating arrangement 26 that is secured to the frame 20.

Figure 3:
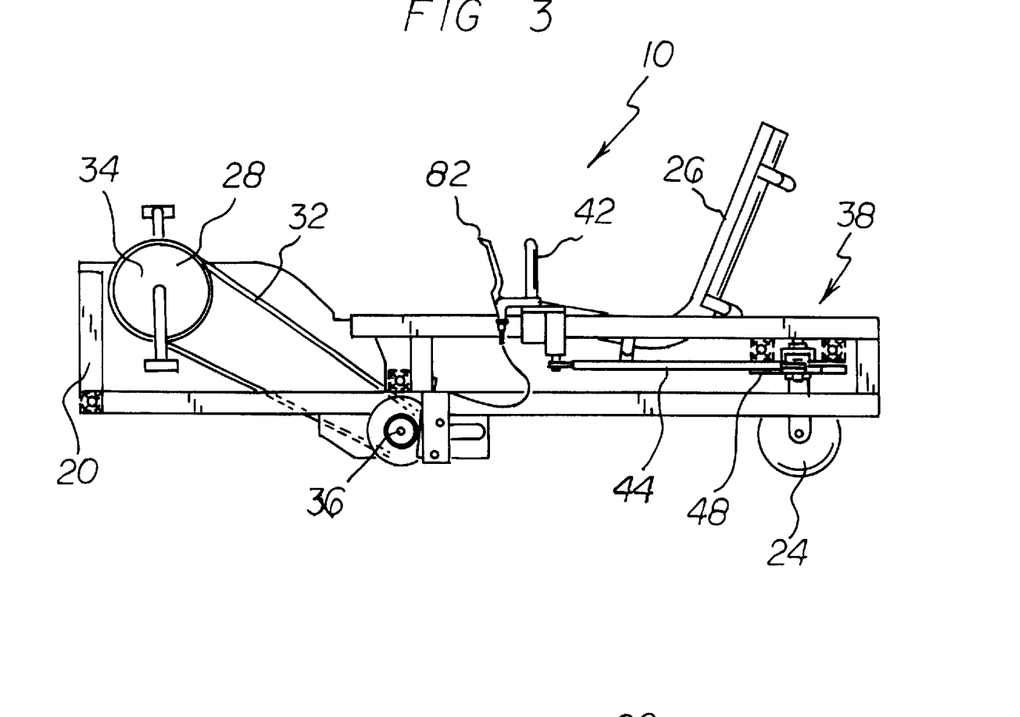
FIG. 3 is a side elevational view of the vehicle of the present invention.
Figure 4:
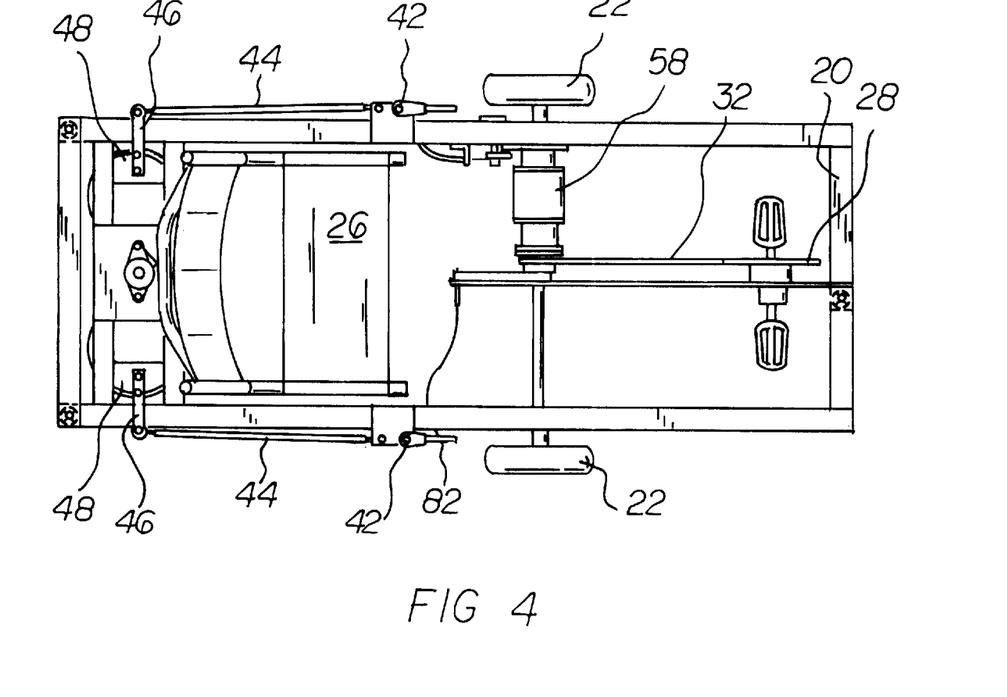
FIG. 4 is a top plan view of the vehicle of the present invention.

The manner in which the vehicle 10 is powered is described next. Namely as is illustrated in FIG. 3, a crank assembly 28 is interconnected to the frame 20 that allows the occupant to power the vehicle 10 with his or her feet. FIG. 3 also illustrates the relationship between the seating arrangement 26 and the crank assembly 28. Namely, the crank assembly 28 is at a location forward of and above the powered wheels. Furthermore, the axis of the crank assembly is level with the bottom portion of the seat 26. As such, when an occupant is properly positioned within the vehicle 10 their lower legs are parallel to the ground and in alignment with their upper chest. It has been found that such a recumbent seating arrangement 26 allows an occupant to deliver maximum rotational force to the, crank assembly 28 with minimal effort. Furthermore, this arrangement allows the occupant to keep their hands free for steering and braking purposes in a manner that will be described more fully hereinafter. The recumbent seating arrangement 26 is preferably adjustable such as to accommodate users of various sizes.

With continuing reference to FIG. 3, the chain drive 32 is depicted. This drive is interconnected between the crank assembly 28 and a lower axle assembly 36. In the preferred embodiment, the crank assembly 28 includes a sprocket 34 that is of a larger diameter than the sprocket of the axle assembly 36. This arrangement provides for an increased mechanical advantage in powering the vehicle. As will be described in greater detail hereinafter, the axle assembly 36 is employed in delivering rotational power to the two powered wheels 22 of the vehicle. Thus, an operator rotating the enlarged sprocket of the crank assembly 28 with his or her feet causes the rotation of the lower axle assembly 36 and the two powered wheels 22.

The steering mechanism 38 of the present invention is described next. The steering mechanism 38 is best illustrated with reference to the plan view of FIG. 5. Specifically, the steering mechanism 38 includes a pair of steering handles 42 located at either side of the vehicle 10. This allows the vehicle occupant to grasp both handles 42 while powering the vehicle 10 with their feet. Each handle is interconnected to a corresponding steering sprocket by way of a flexible and rigid linkage, 44 and 46 respectively. This allows the steering handle to be employed in rotating the steering sprocket 48. More specifically, linear movement of the handle results in a corresponding linear movement of the flexible linkage 44, and a corresponding angular movement of the rigid linkage 46. Angular movement of the rigid linkage 46, in turn, results in the rotational movement of the corresponding steering sprocket 48.

Figure 10:
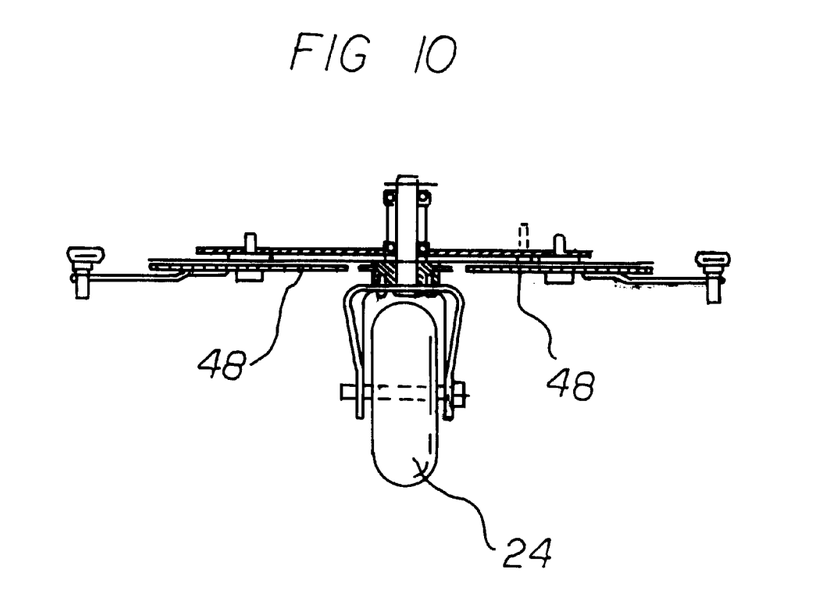
FIG. 10 is a detailed view of the steering wheel of the present invention.
Figure 11:
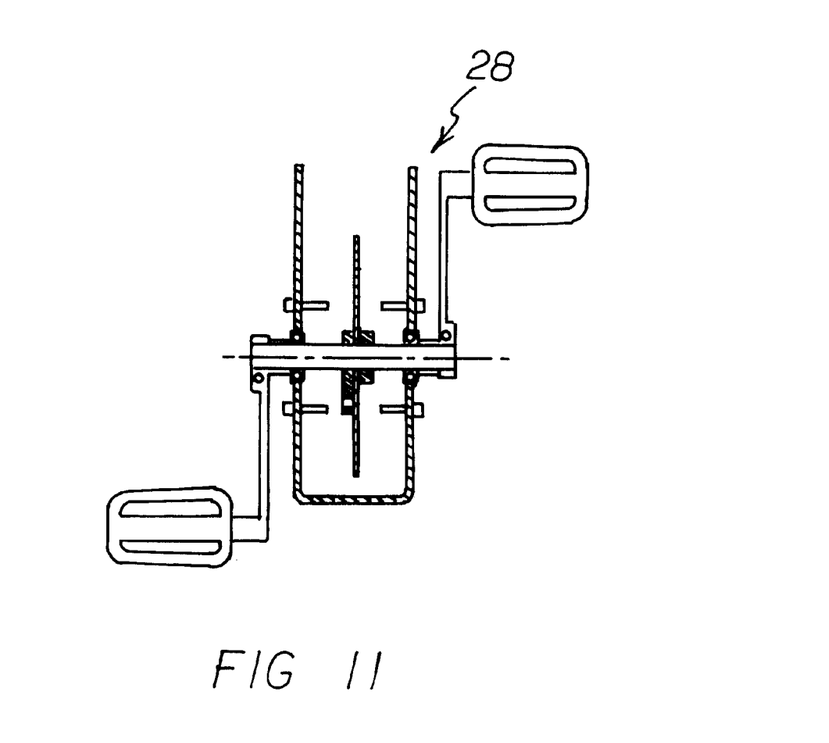
FIG. 11 is a sectional view of the crank assembly.
Figure 12:
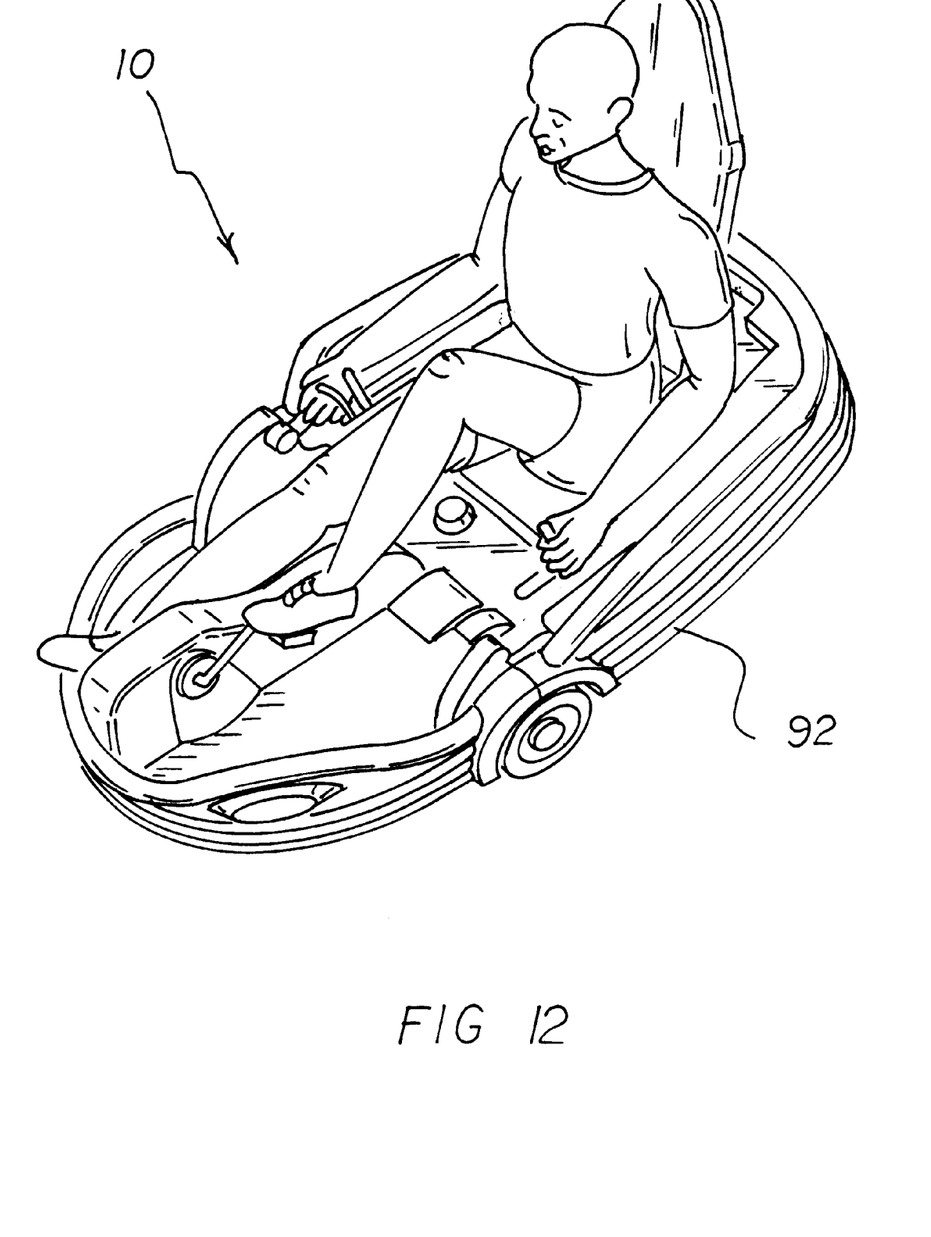
FIGS. 12–16 are view of a foldable embodiment of the present invention.
Figure 13:
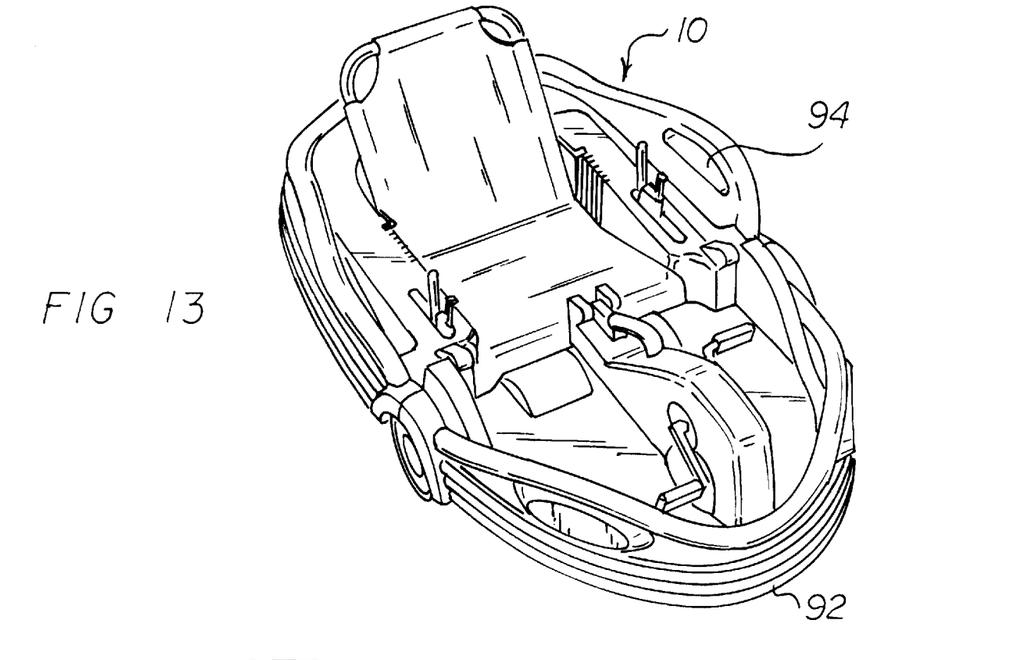
Figure 14:
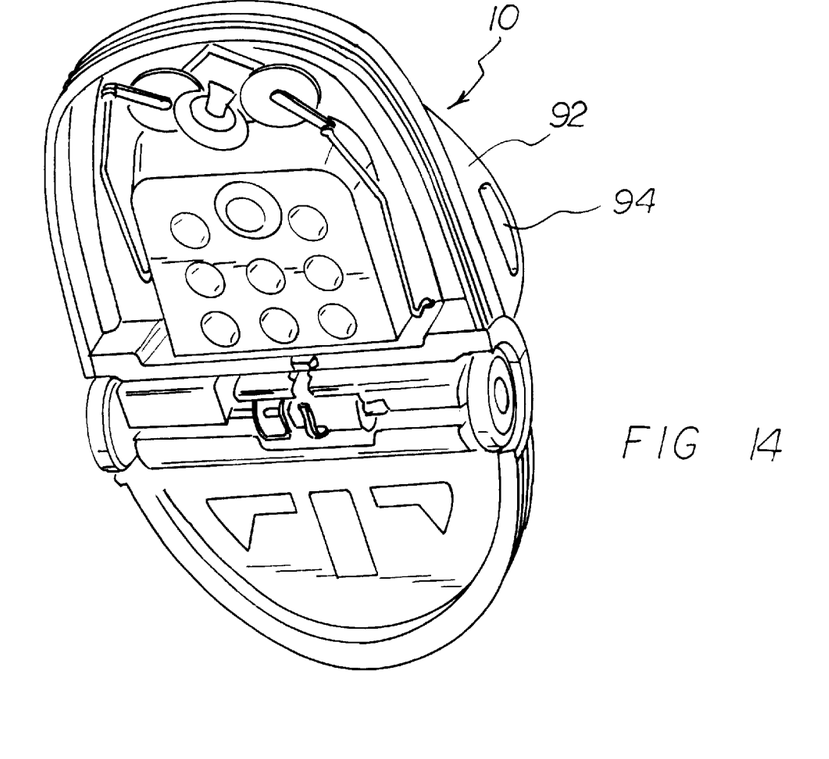

The steering sprockets are located on either side of the rear steering wheel 24 with the rotational axes of the sprockets being perpendicular to, and in alignment with, the rotational axis of the steering wheel 24. The steering wheel 24 further includes a sprocket mounted upon a metal tube, note FIG. 10. FIG. 5 illustrates that the two steering sprockets and the steering wheel 24 are all interconnected by way of a chain drive 52. Namely, the chain drive 52 engages the periphery of both sprockets as well as the sprocket of the steering wheel 24. As such, rotation of the steering sprockets results in rotation of the steering wheel 24 by way of the chain drive 52. This steering arrangement provides for the increased maneuverability of the vehicle 10. That is, the vehicle 10 can be made to turn to its right by pulling the right side steering handle rearwardly. Alternatively, a left-hand turn can be achieved by pulling the left side steering handle rearwardly. Still yet, a left-hand turn with increased angular momentum can be achieved by simultaneously pushing the right side steering handle forwardly and pulling the left, side steering handle rearwardly. Obviously, similar steering options are present for a right-hand turn.

Figure 6:
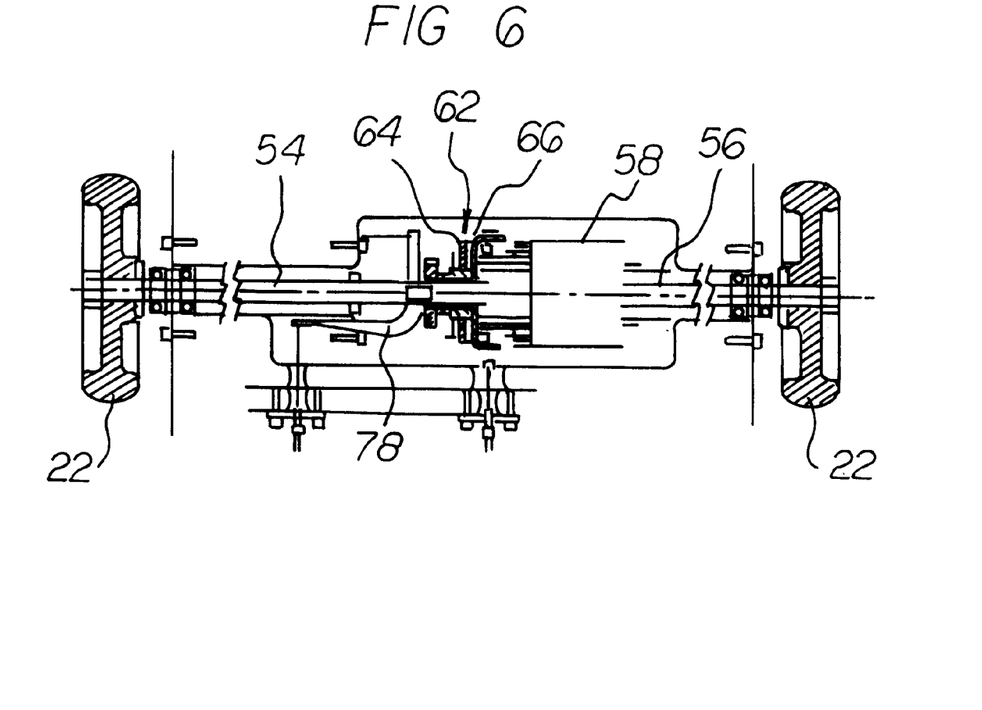
FIG. 6 is a detailed cross sectional view of the axle assembly of the present invention.

The axle assembly of the present invention is next described in conjunction with FIG. 6. The axle assembly is made up of first and second axle components (54 and 56), which are interconnected by a differential 58. This differential 58 allows for the two powered wheels 22 to rotate at different angular velocities. Rotation of the wheels 22 at varying angular velocities is desirable when the vehicle 10 is cornering or otherwise making a turn.

Figure 8:
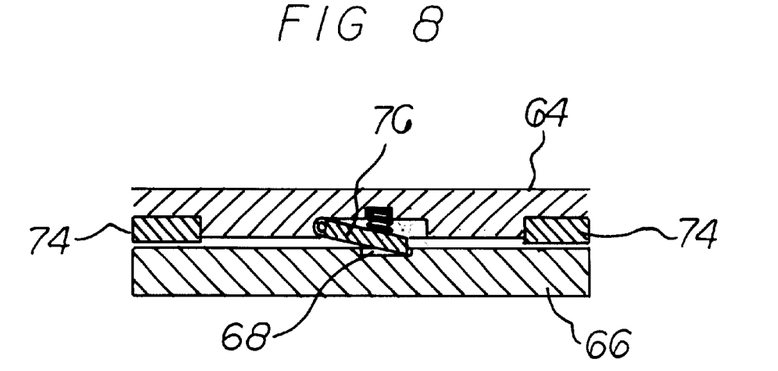
FIG. 8 is a sectional view of the clutch elements of the present invention.
Figure 9:
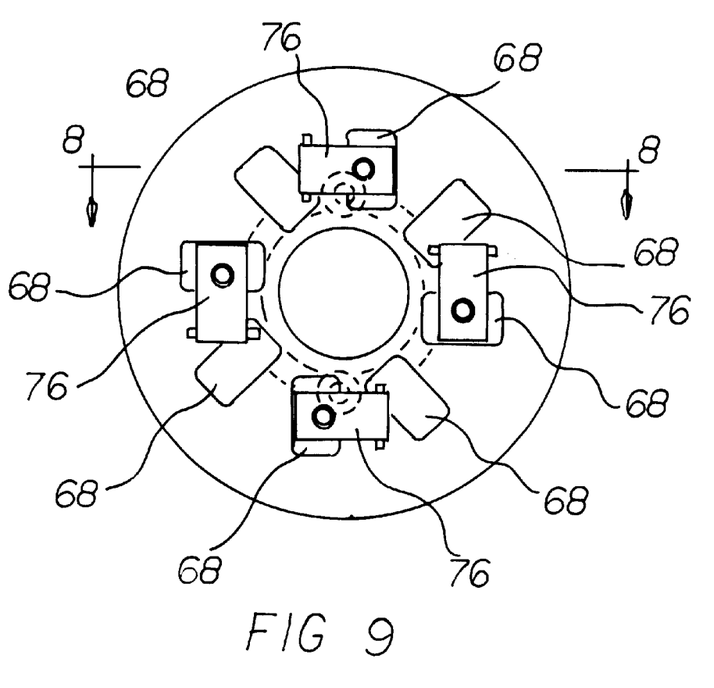
FIG. 9 is a side elevational view of the clutch assembly.

With continuing reference to FIG. 6, the clutch assembly 62 of the present invention is depicted. This clutch assembly 62 provides input into the differential 58 and is employed in rotating both axle components. The clutch assembly 62 is made up of male and female clutch elements, 64 and 66 respectively. These two clutch elements are depicted in FIG. 8. The female clutch element 66 includes a series of cavities 68 within its inner face. In the preferred embodiment, eight such cavities are included. The purposes of these cavities will be described in greater detail hereinafter. FIG. 6 illustrates that the male clutch element 64 is adapted to be engaged and rotated by the chain drive 52. In this regard, a bearing surface is located intermediate the male clutch element 64 and the axle component. The male element 64 has an inner face, which supports a friction lining 74 about its outer periphery. Furthermore, as is illustrated in the cross sectional view of FIG. 8, the male element 64 supports a series of spring biased pawls 76 on its inner face. In the preferred embodiment, four spring biased pawls 76 are included. However, any number of pawls can be included. Four pawls are preferred, however, as this number provides an equal loading around the center bearing and distributes the load over several pawls. Additionally, there could be a varying number of cavities on the female side 66. Eight cavities are preferred as this provides for only a limited amount of rotation before the pawls engage and rotation is transferred.

The male clutch element is adapted to reciprocate upon the underlying axle component. In this regard, a clutch fork 78 is provided to slide the male element 64 along the axle component to selectively position the male clutch element 64 in one of two orientations. Movement of the clutch fork 78, in turn, is achieved by way of a clutch lever 82 on one of the steering handles 42. Thus, by depressing the lever a first, or engaged, clutch orientation is achieved.

In this first orientation, the friction lining 74 is made to engage the inner face of the female clutch element 66 such that a positive fit between the male and female clutch elements (64 and 66) is achieved. In this orientation, the male and female elements (64 and 66) rotate as a single unit. Thus, in this first orientation, rotation of the crank assembly 28 results in rotation of both the male and female clutch elements (64 and 66) and of the two powered wheels accordingly 22. In this orientation, the crank assembly 28 can effectively deliver rotational power in two senses of rotation. In other words, when an operator depresses the clutch lever 82, the clutch is engaged. This permits the vehicle 10 to be pedaled in a forward or rearward direction.

By releasing the clutch lever, the clutch is brought to a second, disengaged orientation. In this orientation, depicted clearly in the sectional view of FIG. 8, the friction lining 74 is disengaged from the female clutch element 66. Here, the only contact between the clutch elements (64 and 66) is achieved by way of the spring biased pins 76. Specifically, each of the spring biased pins 76 is made to engage one of the corresponding cavities 68 of the female clutch element 66. With the pins so engaged, the male clutch element 64 will only transmit rotation in one sense. In the preferred embodiment, the male clutch element 64 only delivers rotational power for the forward movement of the vehicle 10. Rotation in the opposite sense permits the pin elements 76 to slide out of the cavities 68 such that no rotational power is transmitted from the male 64 to the female 66 clutch element and consequently, no rotational power is delivered to the powered wheels 22. As such, if the vehicle 10 is traveling forward and the occupant stops pedaling, the pins 76 will slide out of their cavities 68. This allows the vehicle to coast.

Figure 7:
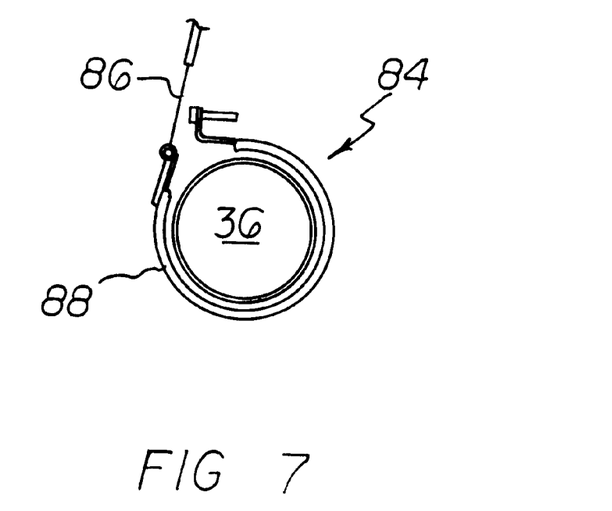
FIG. 7 is a view of the band brake of the present invention

FIG. 6 also discloses the braking arrangement 84 of the present invention. Specifically, the present invention preferably employs a band breaking system. Namely, a friction lined strap 88 is secured about the axles differential (note FIG. 7). The strap can be closed by operation of a brake cable 86. The cable, in turn, is operated by a lever on one of the steering handles. Thus, depressing the brake lever applies tension to both the brake cable and the strap. The tensioning of the strap thereafter effects a slowing of the axle, and thus, the vehicle. The use of other breaking arrangements is within the scope of the present invention. Namely, the present invention could employ a disk braking arrangement.

A specific embodiment of the present invention is depicted with reference to FIGS. 12–16. This embodiment takes advantage of all of steering, clutch, and breaking arrangements previously described. The vehicle of FIGS. 12–16 employs a rotationally molded body 92. The body includes handles 94 (FIG. 13) which are integrally formed within the molded body. Obviously, this embodiment represents only one of the body types that can be employed in conjunction with the principles of the present invention.

Figure 15:
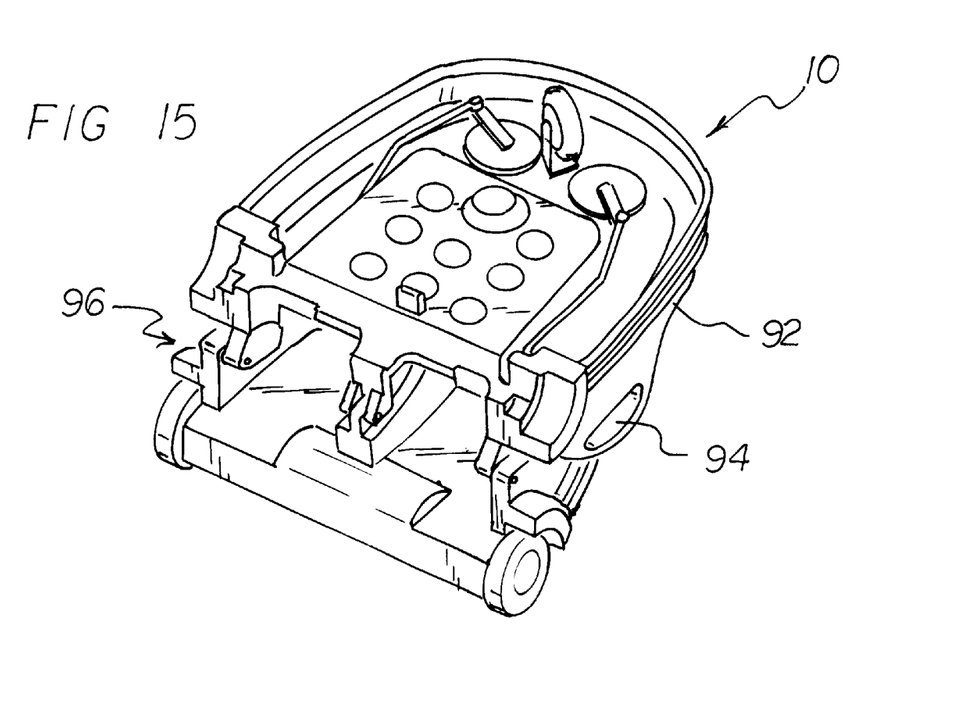
Figure 16:
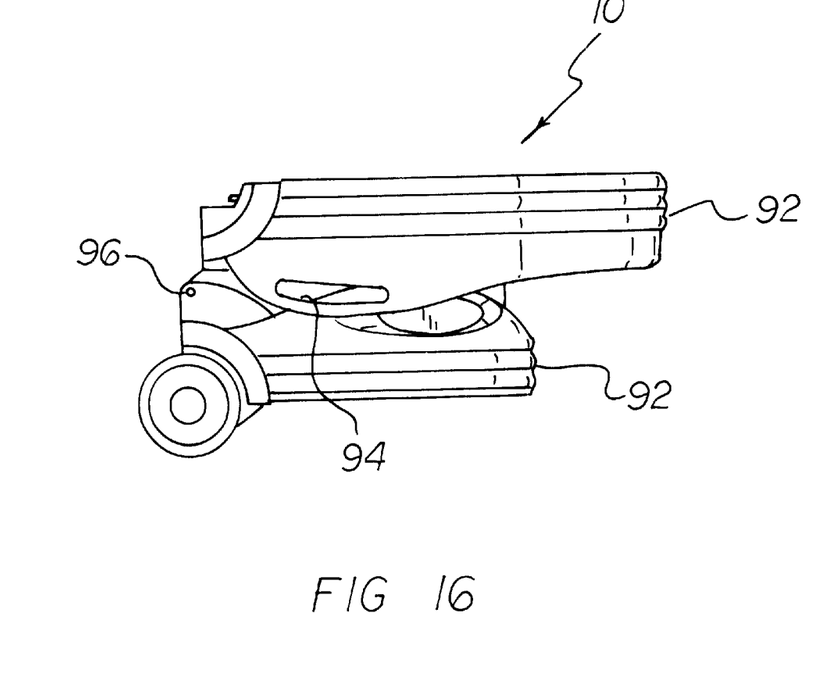

FIGS. 15 and 16 illustrate the foldable nature of this embodiment. Specifically, the vehicle is hinged midway between its first and second ends. As is appreciated from FIG. 16, the folded orientation provides a compact arrangement for the storage and transport of the vehicle. The hinges 96 are preferably integrally molded as part of the body, note FIG. 15.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A pedal powered vehicle adapted for delivering and receiving forceful impacts, the vehicle comprising:

a frame constructed from a rotationally molded impact absorbing plastic, the frame being interconnected to two powered wheels, one steering wheel, and a recumbent seating arrangement;

a crank assembly interconnected to the frame at a location forward of and above the powered wheels, a chain drive interconnected to the crank assembly and an axle assembly, the crank, axle assemblies and chain drive delivering rotational power to the powered wheels;

a pair of steering handles, each handle adapted to rotate a corresponding steering sprocket by way of a flexible and rigid linkage with rotation of the steering sprockets resulting in rotation of the steering wheel by way of a chain drive that engages both the steering sprockets and the steering wheel;

the axle assembly including first and second axle components interconnected by a differential and a clutch assembly adapted to rotate the axle components, the clutch assembly including male and female clutch elements, the female clutch element having a series of cavities within an inner face, the male clutch element being engaged and driven by the drive chain and having an inner face with a friction lining and a series of spring biased pawls, the male clutch element having two orientations, in the first orientation the friction lining is engaged with the inner face of the female clutch element such that rotation of the male clutch element in either rotational sense is transmitted to the female clutch element, in the second orientation the friction lining is disengaged and the spring biased pawls are made to engage the cavities of the female clutch element such that rotation in only one sense is transmitted from the male to the female clutch element.

2. A human powered vehicle comprising:

an impact absorbing frame having two powered wheels and one steering wheel;

a crank assembly interconnected to one of the powered wheels and adapted to deliver power thereto;

an axle assembly including first and second axle components, the axle assembly interconnecting the two powered wheels;

a clutch assembly coupled between the first and second axle components, the clutch assembly having male and female elements each with facing surfaces, the male clutch element having two orientations, in the first orientation the facing surfaces are fully engaged such that rotation of male clutch in either direction is transmitted to the female clutch and axle assembly, and a second orientation wherein the facing surfaces are in limited engagement such that rotation of the male clutch in only one direction is transmitted to the female clutch and axle assembly.

3. The vehicle as described in claim 2 wherein the frame is constructed from a rotationally molded impact absorbing plastic.

4. The vehicle as described in claim 2 wherein the vehicle includes a recumbent seating arrangement.

5. The vehicle as described in claim 2 wherein the crank assembly is interconnected to the frame at a location forward of and above the powered wheels.

6. The vehicle as described in claim 2 wherein the frame can be folded about a hinge.

* * * * *